(12) United States Patent
Liu et al.

(10) Patent No.: US 11,359,743 B2
(45) Date of Patent: Jun. 14, 2022

(54) ELECTRIC WATER DIVERTER

(71) Applicant: Guangzhou Rising Dragon Recreation Industrial Co., Ltd., Guangzhou (CN)

(72) Inventors: Xuewen Liu, Guangzhou (CN); Ziqin Guo, Guangzhou (CN); Yingjun Wu, Guangzhou (CN); Huamin Tang, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 0 days.

(21) Appl. No.: 17/086,465

(22) Filed: Nov. 2, 2020

(65) Prior Publication Data
US 2022/0099216 A1 Mar. 31, 2022

(30) Foreign Application Priority Data
Sep. 30, 2020 (CN) .......................... 202011068955.2

(51) Int. Cl.
| | |
|---|---|
| *F16K 37/00* | (2006.01) |
| *F16K 11/24* | (2006.01) |
| *H02K 29/08* | (2006.01) |
| *F16K 11/085* | (2006.01) |
| *F16K 11/076* | (2006.01) |
| *G06F 3/0362* | (2013.01) |

(52) U.S. Cl.
CPC ........ *F16K 37/0033* (2013.01); *F16K 11/076* (2013.01); *F16K 11/0856* (2013.01); *F16K 11/24* (2013.01); *F16K 37/0008* (2013.01); *F16K 37/0041* (2013.01); *G06F 3/0362* (2013.01); *H02K 29/08* (2013.01)

(58) Field of Classification Search
CPC ............... F16K 11/076; F16K 11/0856; F16K 37/0008; F16K 37/0033; F16K 37/0041; G06F 3/0362
See application file for complete search history.

(56) References Cited

U.S. PATENT DOCUMENTS

| | | | |
|---|---|---|---|
| 6,269,788 B1* | 8/2001 | Kachelek | F01M 1/16 |
| | | | 123/196 R |
| 2007/0044856 A1* | 3/2007 | Bonior | F16K 11/0856 |
| | | | 137/625.47 |
| 2011/0267041 A1* | 11/2011 | Li | G01D 5/145 |
| | | | 324/207.2 |
| 2021/0055136 A1* | 2/2021 | Sapija | F16K 37/0058 |
| 2021/0164576 A1* | 6/2021 | Cheng | F16K 11/0873 |

* cited by examiner

*Primary Examiner* — Atif H Chaudry
(74) *Attorney, Agent, or Firm* — Andrew C. Cheng

(57) ABSTRACT

The present disclosure provides an electric water diverter, which includes a controller, a brushless DC motor, a core and a T-shaped body. The controller is electrically connected to a fixed Hall PCB circuit board and the brushless DC motor in turn. The brushless DC motor has a rotating shaft detachably connected to the core via a connector, which is also embedded with a magnet cooperating with the Hall PCB circuit board. The Hall PCB circuit board obtains a relative position signal of the rotating shaft through Hall induction and feeds the relative position signal back to the controller. A user controls the brushless DC motor to perform phase rotation through the controller and drive the connector and the core to selectively rotate forward or backward relative to the T-shaped body. Thereby, stepless adjustment of water flow from water outlet is achieved.

8 Claims, 7 Drawing Sheets

ELECTRIC WATER DIVERTER

FIELD

The present disclosure relates to a water diverter, in particular to an electric water diverter for a bathtub, hottub or swim spas.

RELATED ART

At present, common water diverters on the market are manually adjusted. Such valves have disadvantages that it takes a lot of effort to twist a core since water to be adjusted impose a large pressure, which is inconvenient for children or women to use; secondly, for such manual adjustment valve, its knob and core must be coaxially connected, which requires making larger room for installation above the back of the hottub body, where is a relatively cramped region in the hottub space; also, because the manual adjustment valve is installed at the top of the hottub body, water must be transported from the bottom of the hottub body to the top of the hottub body through a pipe so as be adjusted, which causes a water pressure loss, and cause a turbulence that generates a noise in the T-shaped body since water flows through the T-shaped body via a pipe elbow. In addition, since the knob of the manual adjustment valve is usually located at a high level, which is a drag on the appearance and design of the hottub. Therefore, it is necessary to provide a water diverter that is electrically driven and adjusted.

SUMMARY OF THE INVENTION

The present disclosure provides an electric water diverter, which realizes an electrically driven and stepless regulation of water flow from a water outlet by the electric drive.

The present disclosure provides an electric water diverter, which includes a controller, a brushless DC motor, a core, and a T-shaped body. The core includes a water inlet and a predetermined number of water outlets. The T-shaped body includes a water inlet port pipe and water outlet port pipes corresponding to the water outlets one to one. The controller is electrically connected to a fixed Hall PCB circuit board and the brushless DC motor in turn. The brushless DC motor has a rotating shaft that is detachably connected to the core via a connector. The connector is also embedded with a magnet cooperating with the Hall PCB circuit board. The Hall PCB circuit board obtains a relative position signal of the motor rotating shaft through Hall induction and feeds it back to the controller. A user controls the brushless DC motor to perform phase rotation through the controller and drive the connector and the core to selectively rotate forward or backward relative to the T-shaped body. Thereby, stepless adjustment of water flow from water outlet is achieved.

Preferably, the controller is embodied as a knob controller, which includes a knob cover and a control circuit board, the control circuit board is provided with a predetermined number of Hall elements, the knob cover is embedded with a magnet cooperating with the Hall elements, and the control circuit board is electrically connected to the Hall PCB circuit board and the brushless DC motor.

Preferably, the controller is embodied as a touch controller, which includes a touch control panel and a control circuit board, the touch control panel is provided with a forward selection button, a reverse rotation button and a stop rotation button, and the control circuit board is electrically connected to the Hall PCB circuit board and the brushless DC motor.

Preferably, one end of the connector connected to the brushless DC motor has a drop-shaped shoulder, and the magnet is embedded in a tip of the drop-shaped shoulder.

Preferably, the electric water diverter further includes a waterproof box for accommodating the brushless DC motor, the waterproof box is provided with a connecting through-opening at a bottom thereof, and the core has a connecting portion that passes through the connecting through-opening and then is connected with and limited by the connector.

Preferably, the connector includes an adapter and a connecting head embedded in the adapter, the adapter is connected with and limited by the connecting portion, and the connection head is connected with and limited by the motor rotating shaft.

Preferably, a star-shaped sealing ring is provided between the connecting portion of the core and the connecting through-hole of the waterproof box.

Preferably, the waterproof box is installed in the T-shaped body, and the waterproof box includes a box body and a cover body, and an O-shaped sealing ring is arranged between the cover body and the box body.

Preferably, the T-shaped body is cooperated with a fixing nut to clamp and fix the waterproof box between the T-shaped body and the fixing nut.

Preferably, the water outlets of the core are arranged one on top of the other in an axial direction and staggered by a certain phase angle, and the water outlet port pipes of the T-shaped body are arranged one on top of the other in the axial direction.

The electric water diverter according to the present disclosure is driven by a brushless DC motor. Compared with the traditional manual water diverter, the electric water diverter provides a more flexible installation position, which solves the disadvantage that the conventional water diverter has a limited installation position; the water diverter is driven by the motor such that various industry pain points, such as adjustment difficulties of the water diverter, too high knob position, too much noise, and large water pressure loss. In addition, with the cooperation of the Hall PCB circuit board and the magnet, the relative rotation position of the motor shaft and the core, can be clearly identified, and thus the water output ratio of different water outlets can be obtained, which is convenient for performing stepless adjustment of water flow according to user's requirements.

THE BRIEF DESCRIPTION OF DRAWINGS

DETAILED DESCRIPTION OF EMBODIMENTS

Figure 1:
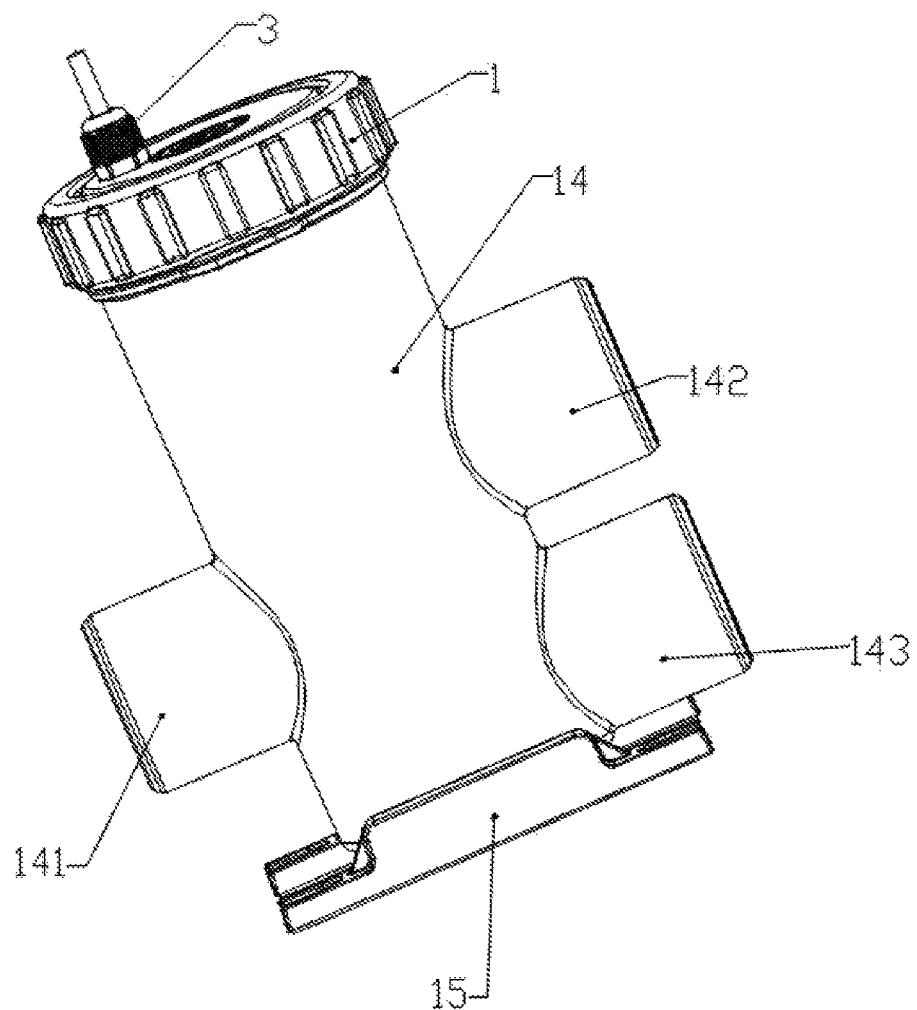
FIG. 1 is a perspective view of an electric water diverter according to the present disclosure, with the controller hidden.

The electric water diverter according to the present disclosure will be further described below with reference to the accompanying drawings. It should be pointed out that technical solution and design principle of the present disclosure will be described in detail below only with an optimized technical solution.

Referring to FIG. 1, FIG. 2, FIG. 3, FIG. 4, FIG. 8 and FIG. 10, an electric water diverter according to an embodiment of the present disclosure includes a controller, a brushless DC motor 5, a core 13 and a T-shaped body 14. The controller is electrically connected to a fixed Hall PCB circuit board 52 and the brushless DC motor 5 in turn. The brushless DC motor 5 has a rotating shaft 51 that is detachedly connected with the core 13 via a connector 7. The connector 7 is embedded with a magnet 8 which is configured for cooperating with the Hall PCB circuit board 52. The Hall PCB circuit board 52 obtains a relative position signal of the motor rotating shaft 51 through Hall induction and feeds the relative position signal back to the controller. A user controls the brushless DC motor 5 to perform phase rotation through the controller and drive the connector 7 and the core 13 to selectively rotate forward or backward relative to the T-shaped body 14. Thereby, stepless adjustment of water flow from water outlets is achieved.

Figure 2:
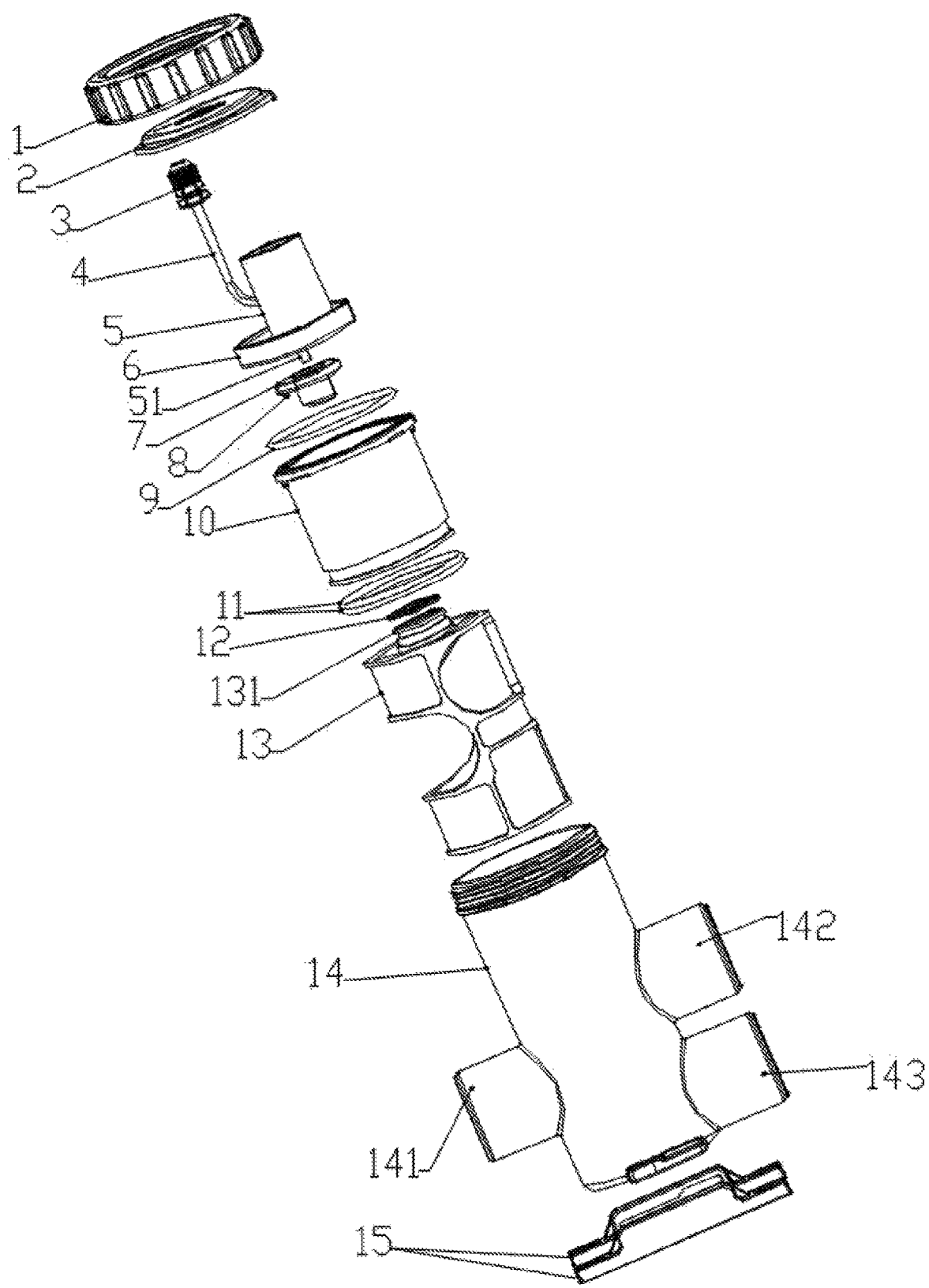
FIG. 2 is an exploded view of FIG. 1.
Figure 3:
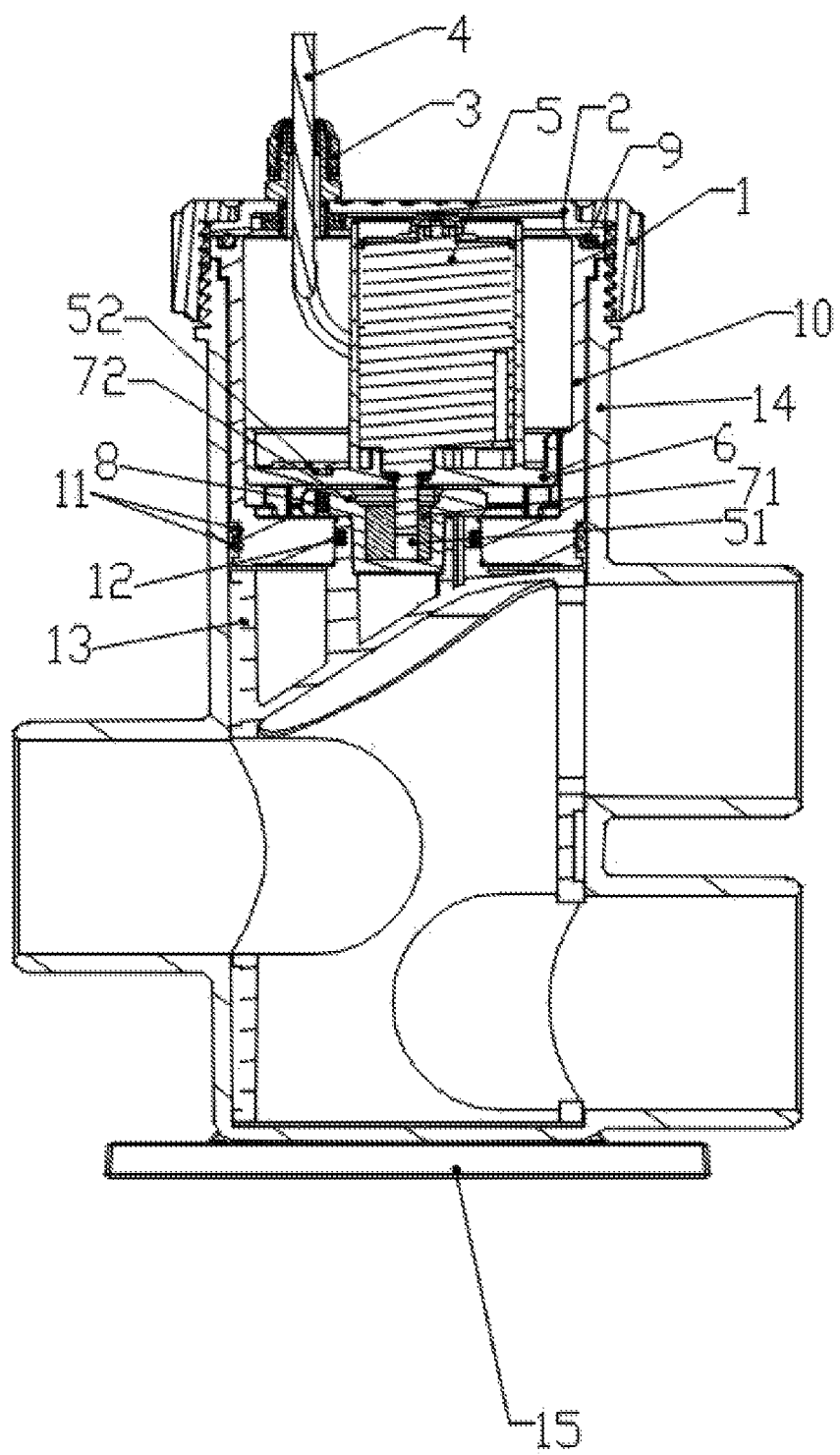
FIG. 3 is a cross-sectional view of FIG. 1.

Specifically, with reference to FIGS. 2 and 3, the electric water diverter further includes a waterproof box for accommodating the brushless DC motor 5 and the Hall PCB circuit board 52. The waterproof box includes a box body 10 and a cover body 2, and the waterproof box is clamped and mounted to the T-shaped body 14 by a lock nut 1 cooperating with the T-shaped body 14.

Figure 4:
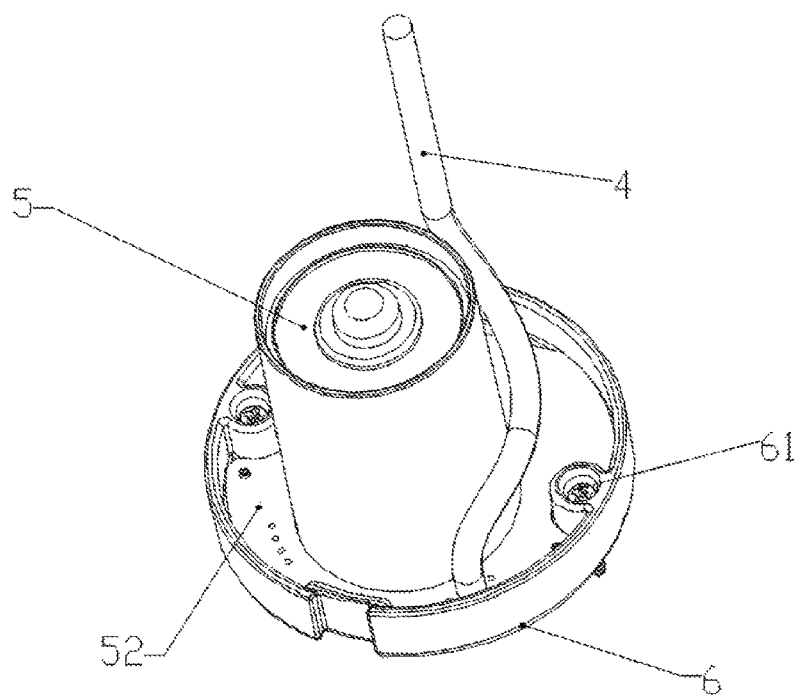
FIG. 4 is a perspective view showing a partial structure of an electric water diverter according to the present disclosure.
Figure 5:
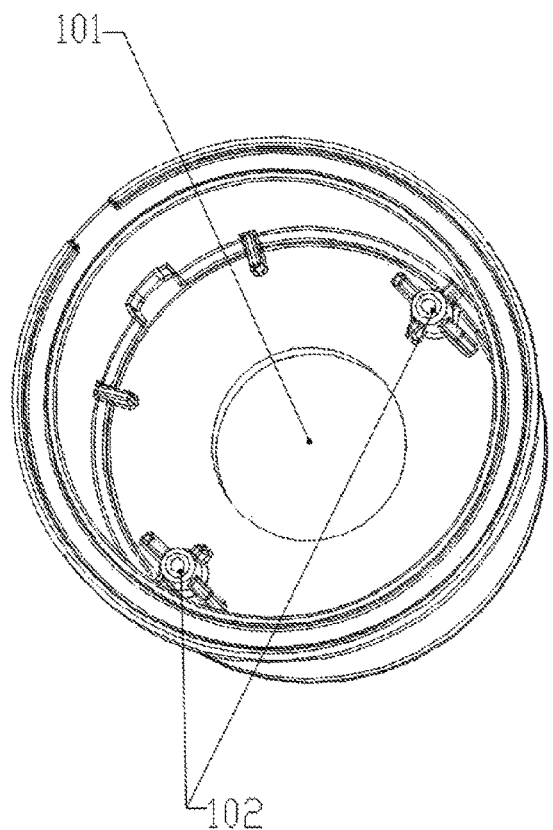
FIG. 5 is a perspective view of a waterproof box of an electric water diverter according to the present disclosure.
Figure 6:
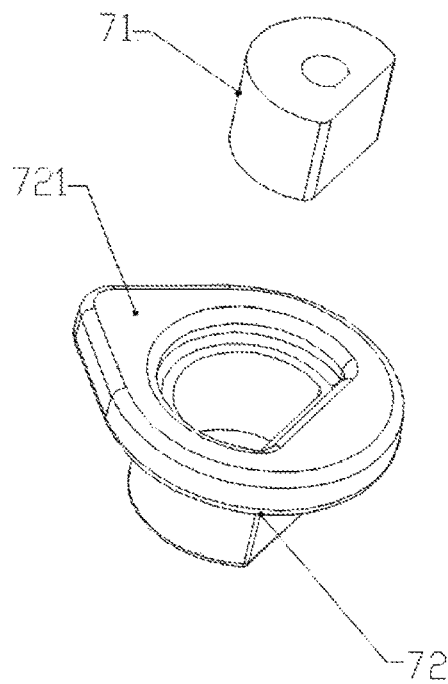
FIG. 6 is an exploded view of a connector of an electric water diverter according to the present disclosure.
Figure 7:
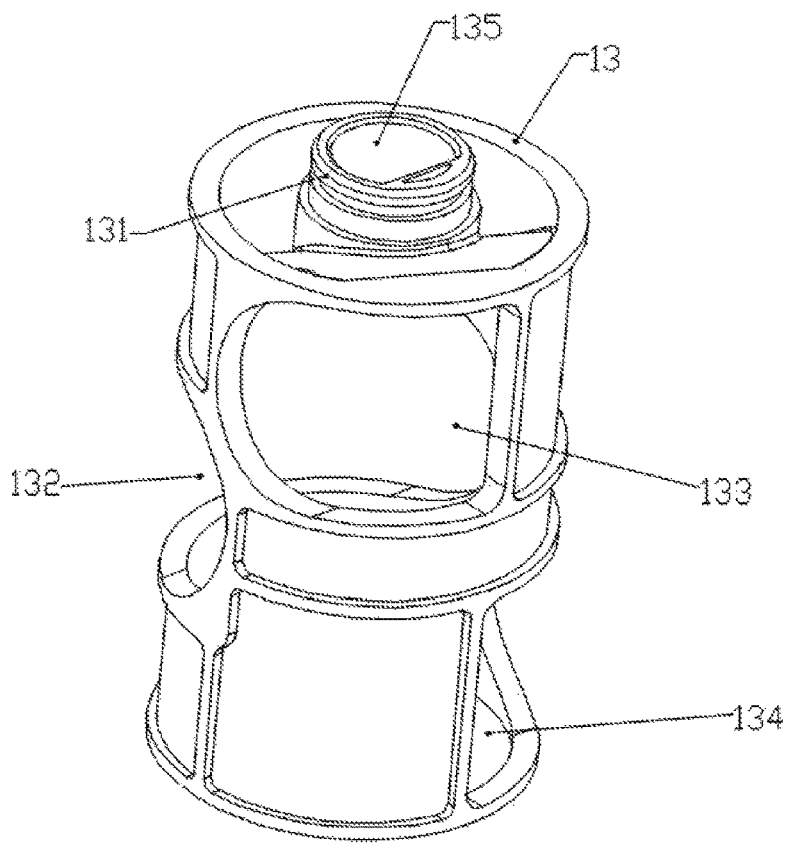
FIG. 7 is a view showing a core of an electric water diverter according to the present disclosure.

Specifically, with reference to FIGS. 4 and 5, the box body 10 is provided with a connecting through-opening 101 at a bottom thereof, and the box body 10 is provided with a threaded hole 102 in an inner end surface thereof near the bottom. The brushless DC motor 5 and the Hall PCB circuit board 52 are fixedly mounted to a mounting base plate 6 which is fixedly mounted within the box body 10 through screws 61 and threaded holes 102, and the motor 5 and the Hall PCB circuit board 52 are therefore fixedly mounted within the box body 10.

Specifically, with reference to FIGS. 2, 3, 5 and 7, the core 13 has a connecting portion 131, a water inlet 132 and two water outlets 133 and 134. The water outlets 133, 134 are arranged one on top of the other in an axial direction of the core 13 and staggered by a certain phase angle. Of course, according to user's requirements, it is possible to provide more water outlets. The connecting portion 131 passes through the connecting through-opening 101 of the box body 10 and is connected with and limited by the connector 7. In addition, the T-shaped body 14 cooperating with the core 13 is provided with a water inlet port pipe 141 and water outlet port pipes 142, 143 corresponding to the water inlet and outlets respectively, with the water outlet port pipes 142, 143 arranged one on top of the other in the axial direction.

Specifically, with reference to FIGS. 2, 3, 6 and 7, the connector 7 includes an adapter 72 and a connecting head 71 embedded in the adapter 72. The adapter 72 is connected with and limited by a D-shaped counterbore formed in the connecting portion 131 of the core 13. The connecting head 71 is also D-shaped. The connecting head 71 is connected to the flattened rotating shaft 51 with the flattened surface of the connecting head 71 facing the flattened surface of the flattened rotating shaft 51. In addition, an end of the adapter 72 close to the brushless DC motor 5 has a drop-shaped shoulder 721, and the magnet 8 is embedded in a tip of the drop-shaped shoulder 721.

With reference to FIGS. 2 and 3, in order to realize waterproof protection of the brushless DC motor 5, in this embodiment, the following waterproof measures are taken, respectively: firstly, a port waterproof member 3 is provided to seal an introduction port of connection wires 4 into the waterproof box; secondly, an O-shaped sealing ring 9 is arranged in an installation gap between the cover body 2 and the box body 10; thirdly, an O-shaped sealing ring 11 is arranged between the waterproof box and the T-shaped body 14; and finally, a star-shaped sealing ring 12 is provided into an installation gap between the connecting portion 131 of the core 13 and the connecting through-opening 101 of the box body 10.

With reference to FIGS. 2 and 3, it is also preferable that the T-shaped body 14 is also provided with a mounting foot 15.

Figure 8:
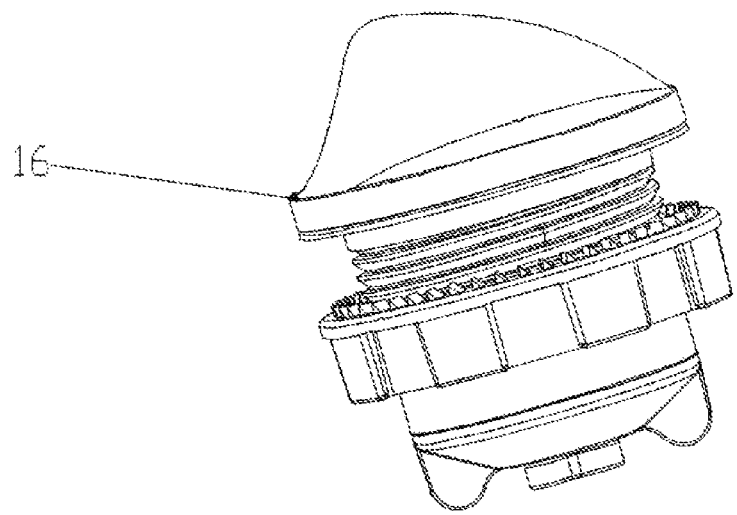
FIG. 8 is a perspective view of a controller according to the present disclosure.
Figure 9:
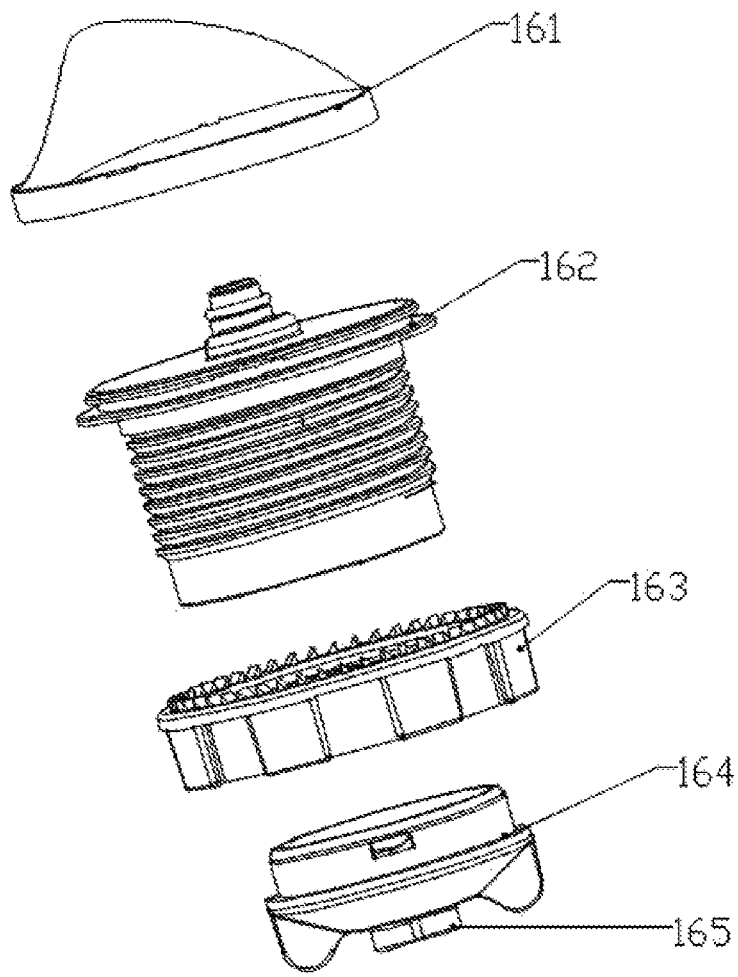
FIG. 9 is an exploded view of the controller in FIG. 8.

Next, With reference to FIGS. 3, 8, and 9, the controller may be embodied as a knob controller 16 which includes a knob cover 161, a mounting seat 162, and a control circuit board (not labeled) provided on the mounting seat 162, a controller locking nut 163 and a base 164. The control circuit board is provided with a predetermined number of Hall elements, and the knob cover 161 is embedded with a magnet cooperating with the Hall elements. The control circuit board is electrically connected to the Hall PCB circuit board 52 and the brushless DC motor 5 through the connecting wires 4. The mounting seat 162 cooperates with the controller lock nut 163 to fix the knob controller 16 on a mounting base.

Figure 10:
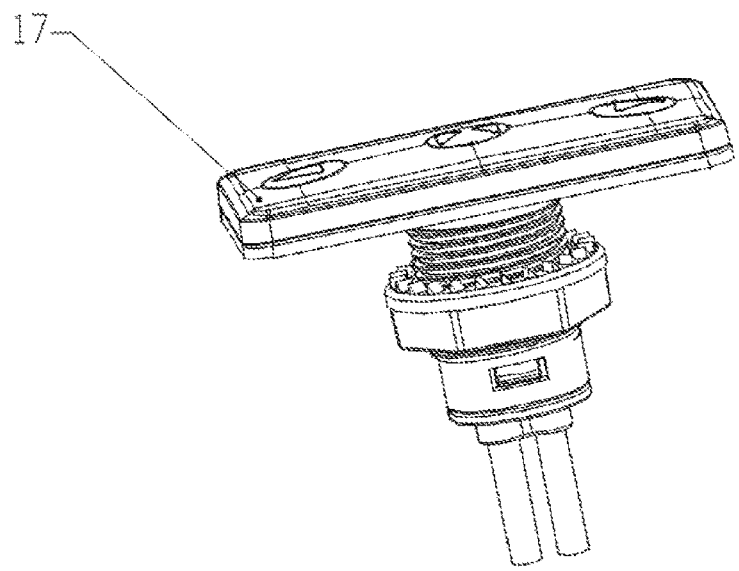
FIG. 10 is a perspective view of another controller according to the present disclosure.
Figure 11:
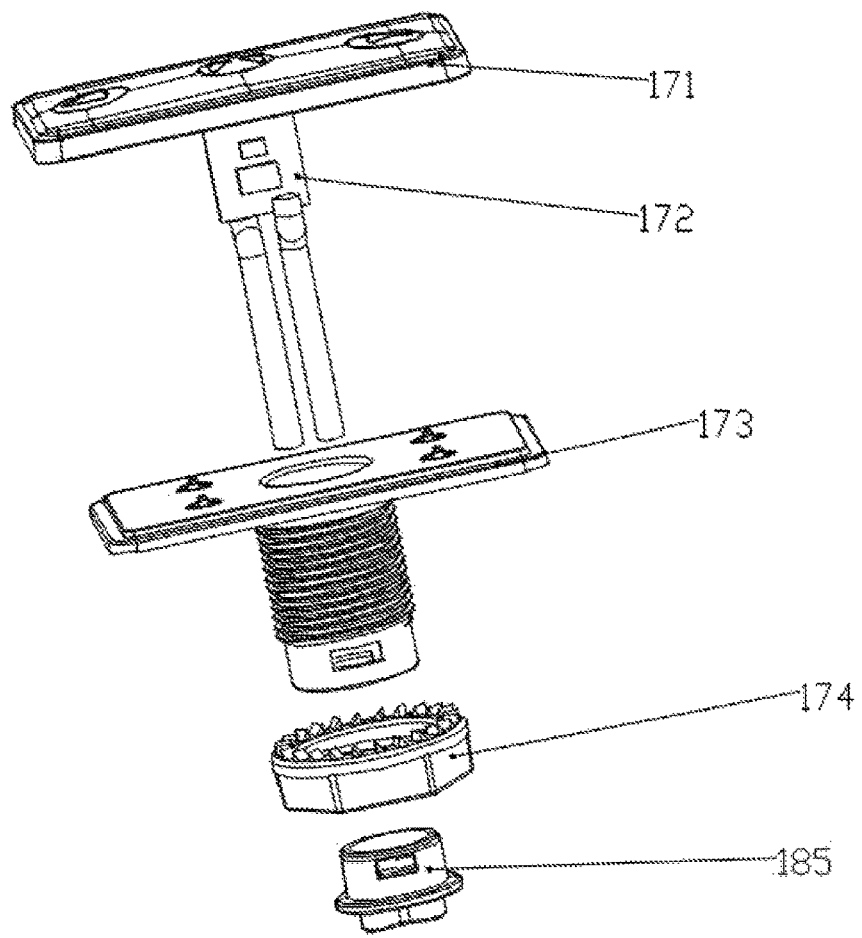
FIG. 11 is an exploded view of the controller in FIG. 10.

With reference to FIGS. 3, 10 and 11, the controller may be embodied as a touch controller 17 which includes a touch control panel 171, a control circuit board 172, a mounting seat 173, a lock nut 174 and a base 185. The touch control panel 171 is provided with a forward selection button, a reverse rotation button, and a stop rotation button. The control circuit board 172 is electrically connected to the Hall PCB circuit board 52 and the brushless DC motor 5 through the connecting wires 4. The mounting seat 173 cooperates with the lock nut 174 to fix the touch controller 17 on a mounting base.

The electric water diverter according to the present disclosure is applied to a hottub. The electric water diverter is electrically driven to divert water and realizes stepless flow adjustment, which greatly improves user experience. In addition, the means for adjusting is installed at the surface position of the hottub, which, compared with the manual control knob of the traditional manual water diverter, makes installation position more flexible, installation height lower, adjustment methods more diverse, and appearance have more possibilities, thereby improving the overall appearance of the hottub.

The above are only the preferred embodiments of the present disclosure. It should be noted that the above preferred embodiments should not be regarded as limitations to the present disclosure, and the protection scope of the present disclosure should be defined by the claims. For those skilled in the art, without departing from the spirit and scope of the present disclosure, several improvements and modifications can be made, and these improvements and modifications should also be regarded as the protection scope of the present disclosure.

What is claimed is:

1. An electric water diverter, which comprises a controller, a brushless DC motor, a core including a water inlet and a predetermined number of water outlets, and a T-shaped body including a water inlet port pipe and water outlet port pipes corresponding to the water outlets respectively, wherein the controller is electrically connected to a fixed Hall PCB circuit board and the brushless DC motor in turn, the brushless DC motor has a rotating shaft that is detachably connected to the core via a connector, the connector is embedded with a magnet cooperating with the Hall PCB circuit board, and the Hall PCB circuit board obtains a relative position signal of the rotating shaft of the motor through Hall induction and feeds the relative position signal back to the controller, and a user is capable of controlling the brushless DC motor to perform phase rotation through the controller and drive the connector and the core to selectively rotate forward or backward relative to the T-shaped body, so as to achieve stepless adjustment of water flow from the water outlets, wherein the controller is a knob controller which comprises a knob cover and a control circuit board, the control circuit board is provided with a predetermined number of Hall elements, the knob cover is embedded with a magnet cooperating with the Hall elements, and the control circuit board is electrically connected to the Hall PCB circuit board and the brushless DC motor.

2. The electric water diverter according to claim 1, wherein an end of the connector connected to the brushless DC motor has a drop-shaped shoulder, and the magnet is embedded in a tip of the drop-shaped shoulder.

3. The electric water diverter according to claim 1, wherein the electric water diverter further comprises a waterproof box for accommodating the brushless DC motor and the Hall PCB circle board, the waterproof box is provided with a connecting through-opening at a bottom thereof, and the core has a connecting portion that passes through the connecting through-opening and then is connected with and limited by the connector.

4. The electric water diverter according to claim 3, wherein the connector comprises an adapter and a connecting head embedded in the adapter, the adapter is connected with and limited by the connecting portion, and the connection head is connected with and limited by the rotating shaft of the motor.

5. The electric water diverter according to claim 3, wherein a sealing ring is provided between the connecting portion of the core and the connecting through-opening of the waterproof box.

6. The electric water diverter according to claim 3, wherein the waterproof box is installed in the T-shaped body, and the waterproof box comprises a box body and a cover body, and an O-shaped sealing ring is arranged between the cover body and the box body.

7. The electric water diverter according to claim 6, wherein the T-shaped body is cooperated with a lock nut to clamp and fasten the waterproof box between the T-shaped body and the lock nut.

8. The electric water diverter according to claim 1, wherein the water outlets of the core are arranged one on top of the other in an axial direction and staggered by a certain phase angle, and the water outlet port pipes of the T-shaped body are arranged one on top of the other in the axial direction.

* * * * *